(12) United States Patent
Cui (10) Patent No.: US 11,609,167 B1
(45) Date of Patent: Mar. 21, 2023

(54) IMPACT SLUG AND IMPACT TESTING APPARATUS HAVING SAME

(71) Applicant: Chinese Institute of Coal Science, Beijing (CN)

(72) Inventor: Chunyang Cui, Beijing (CN)

(73) Assignee: CHINESE INSTITUTE OF COAL SCIENCE, Beijing (CN)

( * ) Notice: Subject to any disclaimer, the term of this patent is extended or adjusted under 35 U.S.C. 154(b) by 0 days.

(21) Appl. No.: 17/820,355

(22) Filed: Aug. 17, 2022

(51) Int. Cl.
*G01N 3/317* (2006.01)
*G01N 3/02* (2006.01)

(52) U.S. Cl.
CPC ............. *G01N 3/317* (2013.01); *G01N 3/02* (2013.01); *G01N 2203/001* (2013.01); *G01N 2203/005* (2013.01)

(58) Field of Classification Search
CPC   G01N 3/02; G01N 3/313; G01N 3/00; G01N 3/08; G01N 3/30; G01N 1/38; G01N 3/303; G01N 3/06; G01N 3/068; G01N 15/0826; G01N 19/00; G01N 19/02; G01N 3/34; G01N 3/58; G01H 17/00; G01M 7/08; G06F 30/20; G06F 30/23; G01L 5/00; A63B 24/0062; A61B 5/02007; A42B 3/046; G01V 99/005
See application file for complete search history.

(56) References Cited

U.S. PATENT DOCUMENTS

| 6,109,093 A | * | 8/2000 | Albertini | ................ G01N 3/307 |
| | | | | 73/12.08 |
| 2018/0017475 A1 | * | 1/2018 | Sweet | ...................... G01N 3/04 |
| 2018/0275034 A1 | * | 9/2018 | Feng | ...................... G01N 3/307 |

FOREIGN PATENT DOCUMENTS

| CN | 104406846 | 3/2015 |
| CN | 106442111 | 2/2017 |
| CN | 106644775 | 5/2017 |
| CN | 111948074 | 11/2020 |
| CN | 112461639 | 3/2021 |
| JP | 2015075351 | 4/2015 |

OTHER PUBLICATIONS

CNIPA, First Office Action for CN Application No. 202110951971.4, dated Sep. 24, 2021.
CNIPA, Notification to Grant Patent Right for Invention for CN Application No. 202110951971.4, dated Oct. 19, 2021.

* cited by examiner

*Primary Examiner* — Brandi N Hopkins
(74) *Attorney, Agent, or Firm* — Hodgson Russ LLP (57) ABSTRACT

An impact slug includes a first slug segment and a second slug segment arranged in sequence along a length direction of the impact slug. The second slug segment is connected to the first slug segment.

14 Claims, 5 Drawing Sheets

IMPACT SLUG AND IMPACT TESTING APPARATUS HAVING SAME

CROSS-REFERENCE TO RELATED APPLICATIONS

This application claims priority to Chinese Patent Application No. 202110951971.4, filed on Aug. 19, 2021, the entire disclosure of which is incorporated herein by reference.

FIELD

The present disclosure relates to a field of impact testing technology and more particularly to an impact slug and an impact testing apparatus having the same.

BACKGROUND

In geotechnical engineering and some other material engineering fields, the Split Hopkinson Pressure Bar (SHPB) is commonly used in test work for studying dynamic response and dynamic parameters of materials under high-velocity impact conditions, but its output stress waveform is simple and cannot meet users' needs for complex target waveforms.

SUMMARY

A complex target waveform may include more than two simple waveforms, and for example, consists of a first waveform and a second waveform. Accordingly, a plurality of slug segments can be produced separately, each of which can excite a simple waveform, such that the plurality of slug segments can excite a plurality of simple waveforms. The plurality of slug segments are connected in series to form an impact slug, and a waveform excited by the impact slug includes a plurality of different simple waveforms connected and is a complex target waveform desired by users.

The present disclosure aims to solve one of the technical problems in the related art at least to some extent.

To this end, embodiments of the present disclosure propose an impact slug that can excite a complex target waveform.

Embodiments of the present disclosure also propose an impact testing apparatus that can output a complex target waveform.

An impact slug according to embodiments of the present disclosure includes a first slug segment and a second slug segment arranged in sequence along a length direction of the impact slug. The second slug segment is connected to the first slug segment. Design parameters of the impact slug are obtained by: obtaining a first target waveform function and a second target waveform function based on a target waveform function of a target complex waveform provided by a user, the first target waveform function and the second target waveform function forming the target waveform function; and obtaining design parameters of the first slug segment based on the first target waveform function and design parameters of the second slug segment based on the second target waveform function. Each of the first slug segment and the second slug segment is a target slug segment, each of the first target waveform function and the second target waveform function is a preset target waveform function, and design parameters of the target slug segment are obtained by the following method.

The target slug segment is physically discretized along its length direction and is discretized into N particles, in which the $i^{th}$ particle at any moment t satisfies a first formula, and the $i^{th}$ particle at any moment $t+\Delta t$ satisfies a second formula, a third formula and a fourth formula, the first formula: $k_i(\Delta u_i - \Delta u_{i-1}) + k_i(\Delta u_{i+1} - \Delta u_i) = m_i \Delta a_i$, $i=1 \ldots N$ the second formula: $v_{i(t+1/2\Delta t)} = v_{i(t)} 1/2 a_{i(t)} \Delta t$, $i=1 \ldots N$ the third formula: $u_{i(t+\Delta t)} = u_{i(t)} + v_{i(t+1/2\Delta t)} \Delta t$, $i=1 \ldots N$ the fourth formula: $v_{i(t+\Delta t)} = v_{i(t+1/2\Delta t)} + 1/2(a_{i(t)} + \Delta a_t)\Delta t$, $i=1 \ldots N$, in which N is an integer greater than or equal to 2; i is any one of 1 to N; t is a preset calculation time; $\Delta t$ is a time step length; $\Delta u_i$ is a displacement increment of the $i^{th}$ particle; $k_i$ is a stiffness coefficient of the $i^{th}$ particle; $m_i$ is a mass of the $i^{th}$ particle; $\Delta a_i$ is an acceleration increment of the $i^{th}$ particle; $v_i$ is a velocity of the $i^{th}$ particle; $a_i$ is an acceleration of the $i^{th}$ particle; and $u_i$ is a displacement of the $i^{th}$ particle.

A calculated target waveform function, in a discrete form, of the target slug segment is obtained by an iterative algorithm. When a difference between the calculated target waveform function in the discrete form and the preset target waveform function is smaller than or equal to a preset value, design parameters corresponding to the calculated target waveform function in the discrete form are the design parameters of the target slug segment.

An impact testing apparatus according to embodiments of the present disclosure includes a holder and an impact slug on the holder. The impact slug includes a first slug segment and a second slug segment arranged in sequence along a length direction of the impact slug. The second slug segment is connected to the first slug segment. Design parameters of the impact slug are obtained by: obtaining a first target waveform function and a second target waveform function based on a target waveform function of a target complex waveform provided by a user, the first target waveform function and the second target waveform function forming the target waveform function; and obtaining design parameters of the first slug segment based on the first target waveform function and design parameters of the second slug segment based on the second target waveform function.

Each of the first slug segment and the second slug segment is a target slug segment, each of the first target waveform function and the second target waveform function is a preset target waveform function, and design parameters of the target slug segment are obtained by the following method.

The target slug segment is physically discretized along its length direction and is discretized into N particles, in which the $i^{th}$ particle at any moment t satisfies a first formula, and the $i^{th}$ particle at any moment $t+\Delta t$ satisfies a second formula, a third formula and a fourth formula, the first formula: $k_i(\Delta u_i - \Delta u_{i-1}) + k_i(\Delta u_{i+1} - \Delta u_i) = m_i \Delta a_i$, $i=1 \ldots N$ the second formula: $v_{i(t+1/2\Delta t)} = v_{i(t)} 1/2 a_{i(t)} \Delta t$, $i=1 \ldots N$ the third formula: $u_{i(t+\Delta t)} = u_{i(t)} + v_{i(t+1/2\Delta t)} \Delta t$, $i=1 \ldots N$ the fourth formula: $v_{i(t+\Delta t)} = v_{i(t+1/2\Delta t)} + 1/2(a_{i(t)} + \Delta a_t)\Delta t$, $i=1 \ldots N$, in which N is an integer greater than or equal to 2; i is any one of 1 to N; t is a preset calculation time; $\Delta t$ is a time step length; $\Delta u_i$ is a displacement increment of the $i^{th}$ particle; $k_i$ is a stiffness coefficient of the $i^{th}$ particle; $m_i$ is a mass of the $i^{th}$ particle; $\Delta a_i$ is an acceleration increment of the $i^{th}$ particle; $v_i$ is a velocity of the $i^{th}$ particle; $a_i$ is an acceleration of the $i^{th}$ particle; and $u_i$ is a displacement of the $i^{th}$ particle.

A calculated target waveform function, in a discrete form, of the target slug segment is obtained by an iterative algorithm. When a difference between the calculated target waveform function in the discrete form and the preset target waveform function is smaller than or equal to a preset value, design parameters corresponding to the calculated target waveform function in the discrete form are the design parameters of the target slug segment.

DETAILED DESCRIPTION

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

Figure 1:
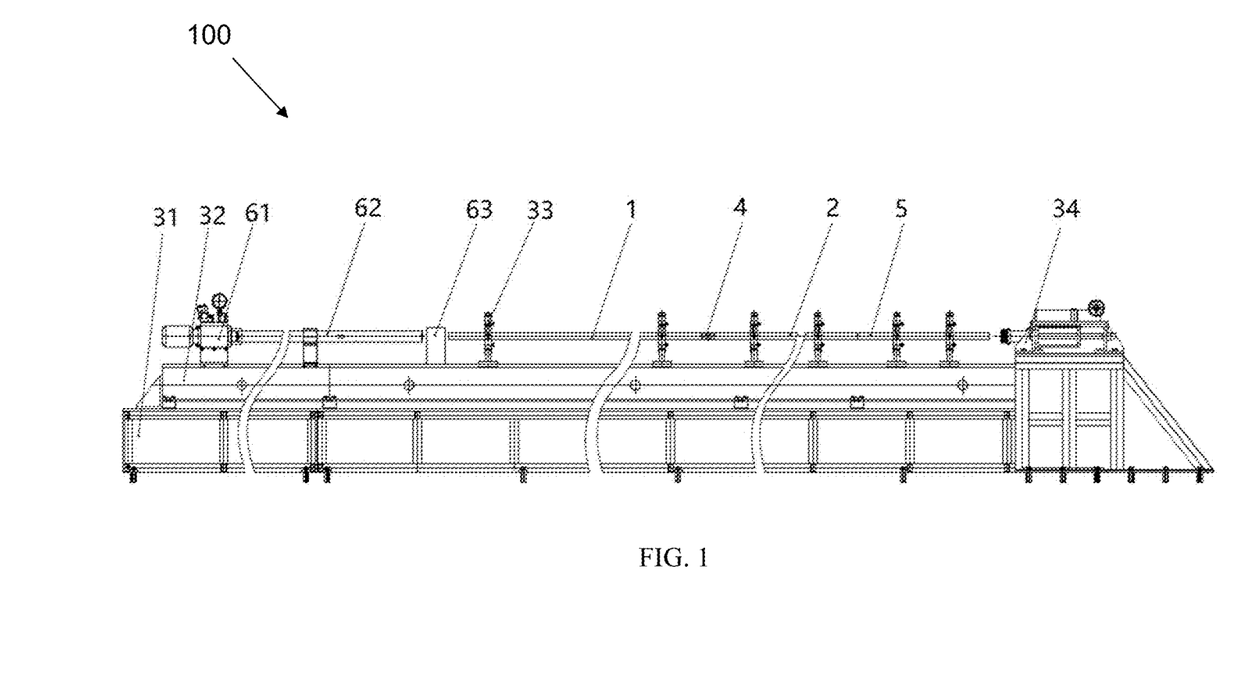
FIG. 1 is a schematic diagram of an impact testing apparatus according to an embodiment of the present disclosure.
Figure 2:
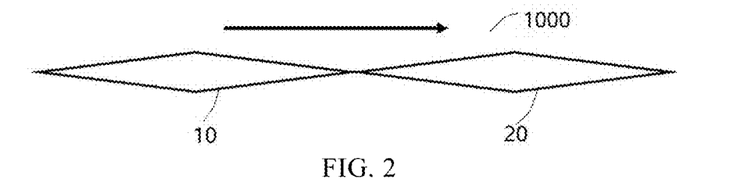
FIG. 2 is a schematic diagram of a first embodiment of an impact slug in FIG. 1.
Figure 3:
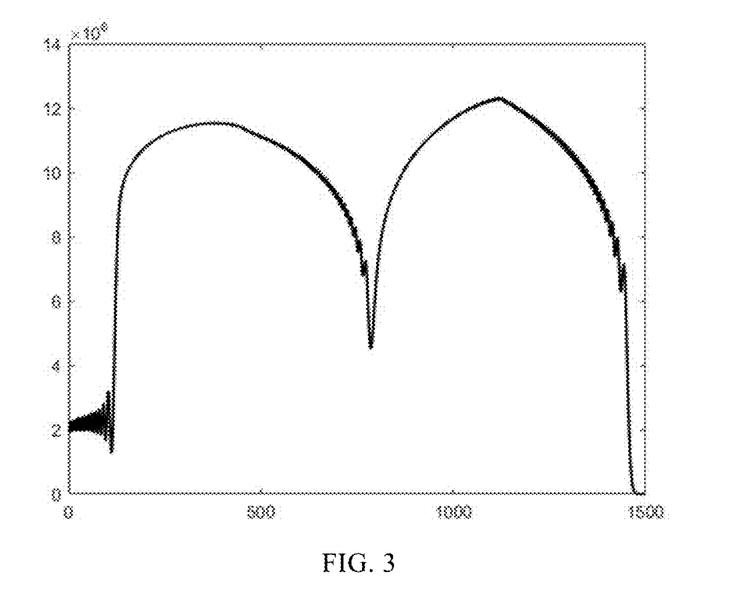
FIG. 3 illustrates a waveform excited by the impact slug in FIG. 2.

As shown in FIGS. 1-3, an impact testing apparatus 100 according to embodiments of the present disclosure includes a holder and an impact slug 1000 on the holder.

In some embodiments, the holder includes a base 31, an I-shaped steel 32, a central bracket 33 and a buffer 34. The I-shaped steel 32 is on the base 31 and is connected to the base 31. The central bracket 33 is above the I-shaped steel 32 and is connected to the I-shaped steel 32. The buffer 34 is on a side of the base 31 in a length direction of the base and is connected to the base 31, and the buffer 34 acts as an energy absorbing device.

In some embodiments, the impact testing apparatus 100 further includes an injection rod 1, a transmission rod 2, and an absorption rod 5. The impact slug 1000, the injection rod 1, the transmission rod 2 and the absorption rod 5 are arranged sequentially along a length direction of the central bracket 33.

In some embodiments, the impact testing apparatus 100 further includes a launch system on the I-shaped steel 32; the launch system is at an end of the length direction of the central bracket 33 and adjacent to the injection rod 1; and the launch system includes the above-mentioned impact slug 1000.

In some embodiments, the launch system includes a launcher 61, a launch tube 62, and a velocimeter 63, the launcher 61, the launch tube 62 and the velocimeter 63 being arranged in sequence along the length direction of the central bracket 33. The launcher 61 includes the above-mentioned impact slug 1000. The launcher 61 can be inflated inside, and opening a valve of the launcher 61 allows gas to gush out of the launch tube 62, propelling the impact slug 1000 to be ejected at high speed.

The impact testing apparatus 100 further includes a power supply that provides working power to the impact testing apparatus 100.

When an impact test is carried out using the impact testing apparatus 100, a specimen 4 is placed between the injection rod 1 and the transmission rod 2, and the injection rod 1, the specimen 4, the transmission rod 2 and the absorption rod 5 are kept on a common horizontal line by the central bracket 33 and are movable along the length direction of the central bracket 33.

In some embodiments, the injection rod 1 and the transmission rod 2 have a same length that is greater than a target wavelength, the target wavelength being determined according to a target frequency of a complex target waveform.

The impact slug 1000 according to embodiments of the present disclosure will be described below.

As shown in FIGS. 2-5, the impact slug 1000 according to the embodiments of the present disclosure includes a first slug segment 10 and a second slug segment 20 arranged in sequence along a length direction of the impact slug 1000. The second slug segment 20 is connected to the first slug segment 10, such that the first slug segment 10 and the second slug segment 20 are connected in series along the length direction of the impact slug 1000.

In the related art, impact test equipment can only output simple waveforms, which cannot meet users' needs for complex target waveforms.

Figure 4:
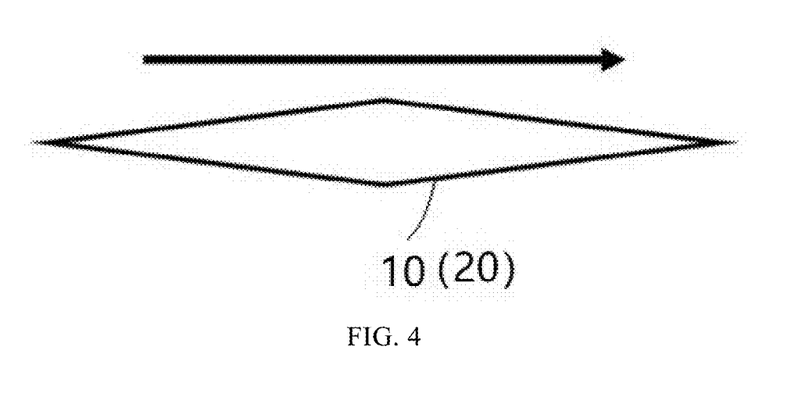
FIG. 4 is a schematic diagram of a first slug segment and a second slug segment in FIG. 2.
Figure 5:
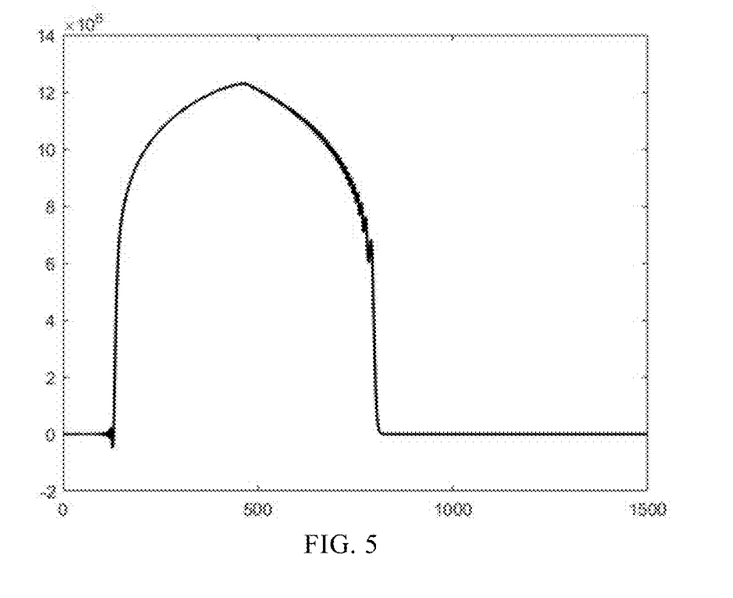
FIG. 5 illustrates a waveform excited by the first slug segment of FIG. 2 alone and a waveform excited by the second slug segment of FIG. 2 alone.
Figure 6:
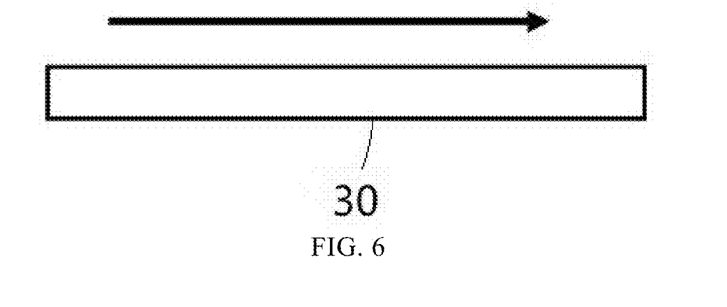
FIG. 6 is a schematic diagram of a first slug segment of a second embodiment of an impact slug in FIG. 1.
Figure 7:
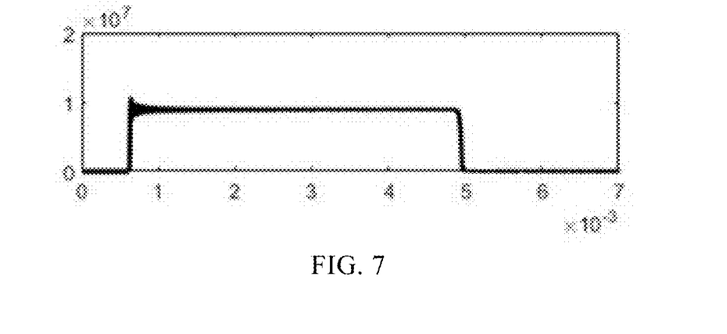
FIG. 7 illustrates a waveform excited by the first slug segment in FIG. 6.
Figure 8:
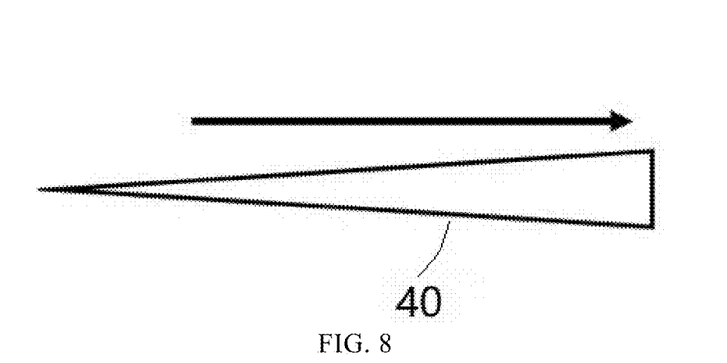
FIG. 8 is a schematic diagram of a first slug segment of a third embodiment of an impact slug in FIG. 1.
Figure 9:
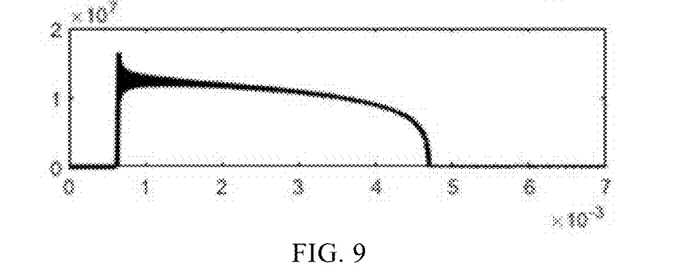
FIG. 9 illustrates a waveform excited by the first slug segment in FIG. 8.
Figure 10:
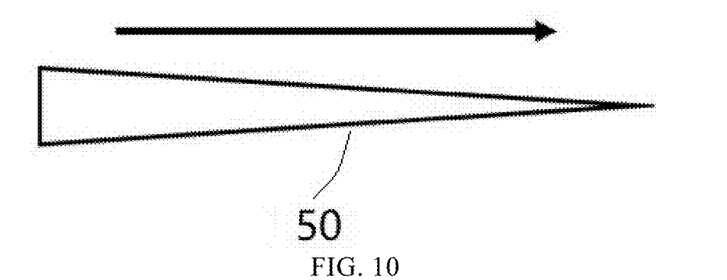
FIG. 10 is a schematic diagram of a first slug segment of a fourth embodiment of an impact slug in FIG. 1.
Figure 11:
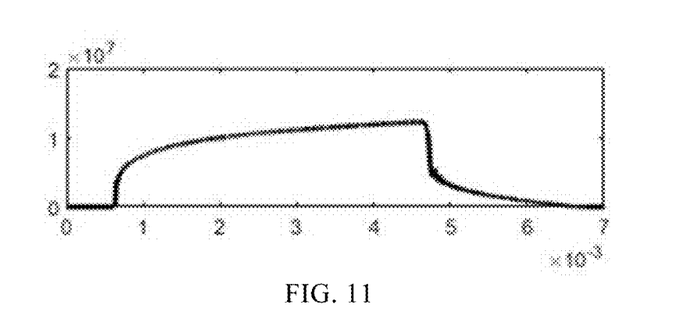
FIG. 11 illustrates a waveform excited by the first slug segment in FIG. 10.
Figure 12:
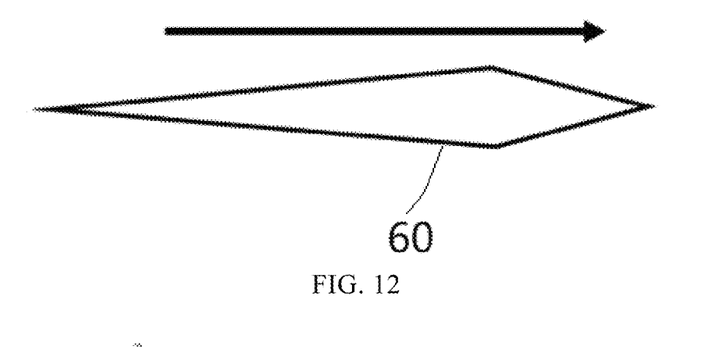
FIG. 12 is a schematic diagram of a first slug segment of a fifth embodiment of an impact slug in FIG. 1.
Figure 13:
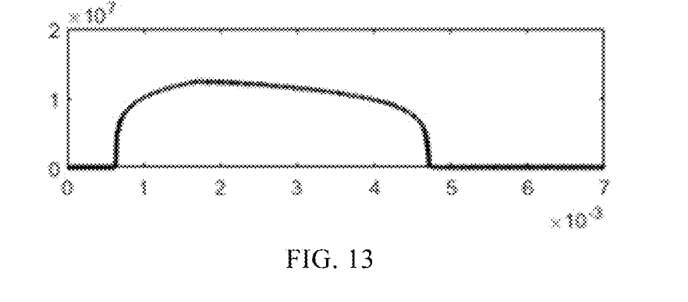
FIG. 13 illustrates a waveform excited by the first slug segment in FIG. 12.
Figure 14:
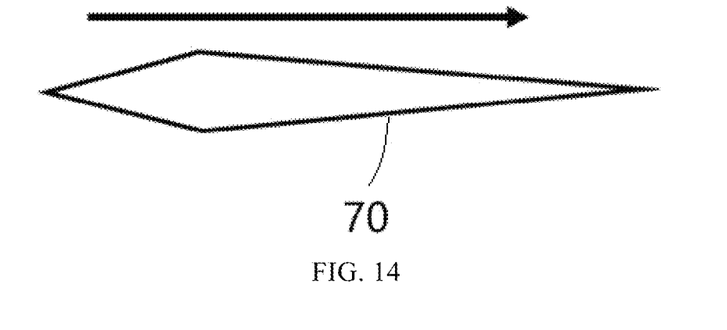
FIG. 14 is a schematic diagram of a first slug segment of a sixth embodiment of an impact slug in FIG. 1.
Figure 15:
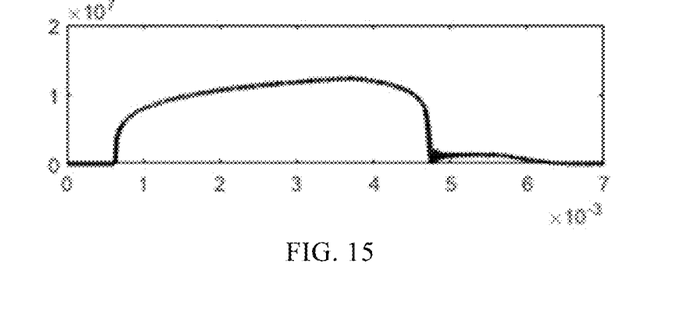
FIG. 15 illustrates a waveform excited by the first slug segment in FIG. 14.

The impact testing apparatus 100 according to the embodiments of the present disclosure has the impact slug 1000 including the first slug segment 10 and the second slug segment 20 connected in series, in which the first slug segment 10 alone can excite a first waveform, the second slug segment 20 alone can excite a second waveform, and the first waveform and the second waveform may be identical or different. For example, as shown in FIGS. 4 and 5, the first waveform and the second waveform are identical when the first slug segment 10 and the second slug segment 20 are the same; and the first waveform and the second waveform are different when the first slug segment and the second slug segment are different (in shape or elastic modulus). As shown in FIGS. 2 and 3, the impact slug 1000 formed by the first slug segment 10 and the second slug segment 20 connected in series can excite a complex waveform shown in FIG. 3, and the complex waveform generally consists of the first waveform and the second waveform and is the complex target waveform required by users.

As a result, the impact testing apparatus according to the embodiments of the present disclosure is able to meet the needs of the users.

In some embodiments, the second slug segment has a different shape and/or a different elastic modulus from the first slug segment.

The fact that second slug segment has a different shape and/or a different elastic modulus from the first slug segment means: the second slug segment has a different shape from the first slug segment; alternatively, the second slug segment has a different size from the first slug segment; alternatively, the second slug segment has a different shape and a different elastic modulus from the first slug segment.

Since the second slug segment has a different shape and/or a different elastic modulus from the first slug segment, the first waveform excited using the first slug segment is different from the second waveform excited using the second slug segment. As a result, the impact slug including the first slug segment and the second slug segment can excite the complex target waveform with front and rear waveforms (the first and second waveforms) being different, to better meet the users' needs for complex target waveforms.

In some embodiments, the first slug segment has at least one of a cylindrical shape, a spindle shape, and a pyramid shape.

For example, as shown in FIGS. 3-15, arrows in these figures show an impact direction of the impact slug, and first impact slug segments with different shapes can excite waveforms in different shapes.

Consequently, different simple waveforms can be excited using first slug segments of cylindrical, spindle and pyramid shapes, and different complex target waveforms can be excited using the impact slug with first slug segments, better satisfying the users' needs for different complex target waveforms.

In some embodiments, the second slug segment has at least one of a cylindrical shape, a spindle shape, and a pyramid shape.

Consequently, different simple waveforms can be excited using second slug segments of cylindrical, spindle and pyramid shapes, and different complex target waveforms can be excited using the impact slug with second slug segments, better satisfying the users' needs for different complex target waveforms.

In some embodiments, there is a connection member for connection between the first slug segment and the second slug segment; alternatively, the second slug segment is connected to the first slug segment by bonding.

For example, the second slug segment 20 and the first slug segment 10 are connected by an epoxy resin adhesive.

The epoxy resin adhesive has an elastic modulus much smaller than an elastic modulus of the first slug segment and than an elastic modulus of the second slug segment. The intensity of the first waveform excited using the first slug segment and the second waveform excited using the second slug segment is much greater than the intensity of a waveform excited using the epoxy resin adhesive, such that a waveform excited by the impact slug is mainly composed of the first waveform and the second waveform and is closer to or even equal to the complex target waveform. Thus, the accuracy of the impact test is improved.

In some embodiments, each of the first slug segment and the second slug segment is made of a POM material.

In an example, three first slug segment each have a spindle shape and a different length, i.e., 30 cm, 50 cm and 80 cm; a diameter of an initial impact end is 20% of a diameter of a midpoint, to ensure an approximately straight spindle shape of a strain rising section; and a pulse waveform with a medium strain rate can be achieved, as shown in Table 1.

TABLE 1

| dynamic characteristic parameters in low-velocity impact conditions | | | |
|---|---|---|---|
| Length of POM first slug segment | 30 cm | 50 cm | 80 cm |
| Single pulse average duration | 1.7 ms | 2.8 ms | 4.1 ms |
| Single pulse strain amplitude | 0.00014 | 0.00014 | 0.00015 |
| Single pulse strain rate | 0.082 | 0.051 | 0.036 |

A lower density of the POM material makes the single pulse strain amplitude lower than that of a metal first slug segment made of alloy steel or alloy aluminum. An initial velocity of the first slug segment can be increased to achieve a high amplitude pulse at a low strain rate level, ensuring that impact damage occurs in certain materials with high dynamic strength. Table 2 shows dynamic characteristic parameters after the impact velocity is doubled.

TABLE 2

| dynamic characteristic parameters in medium-velocity impact conditions. | | | |
|---|---|---|---|
| Length of POM first slug segment | 30 cm | 50 cm | 80 cm |
| Single pulse average duration | 1.6 ms | 2.6 ms | 4.0 ms |
| Single pulse strain amplitude | 0.00060 | 0.00067 | 0.00069 |
| Single pulse strain rate | 0.375 | 0.257 | 0.173 |

In practice, the length and impact velocity of the POM spindle-shaped first slug segment can be obtained by linear interpolation of the above tables according to a required impact strain rate and a required impact amplitude. Additionally, the average duration, the strain amplitude at a certain initial velocity, and the corresponding strain rate of the single pulse excitable by the first slug segment to be test, can be known from the above tables.

Thus, each of the first slug segment and the second slug segment is made of the POM material, such that the impact testing apparatus can output stress waves with a medium strain rate, i.e., in a range of $10^{-2}$-$10^{1}$/s, and the dynamic response and dynamic parameters of the specimen can be tested at different levels of the medium strain rate.

In some embodiments, the impact testing apparatus is lengthened in its entirety.

Specifically, the holder of the impact testing apparatus is longer than a theoretical length of the impact testing apparatus to accommodate the installation of the energy absorbing device and the launch system. The theoretical length of the impact testing apparatus is a sum of twice the target wavelength and a length of a preset additional device.

In some embodiments, design parameters of the impact slug are obtained using the following method.

A first target waveform function and a second target waveform function are obtained based on a target waveform function of a target complex waveform provided by a user, and the first target waveform function and the second target waveform function form the target waveform function.

Design parameters of the first slug segment are obtained based on the first target waveform function and design parameters of the second slug segment are obtained based on the second target waveform function.

In other words, both the first slug segment and the second slug segment are obtained based on the target waveform function of the target complex waveform provided by the user.

The impact slug of the impact test equipment in the related art has a single shape and can only output waveforms in a specific shape, which cannot meet the user's needs for different waveforms.

The impact testing apparatus according to the embodiments of the present disclosure can control the waveform output by the impact testing apparatus through control over the design parameters of the first slug segment and the second slug segment, and hence the impact testing apparatus can better meet the user's needs for different complex target waveforms.

In some embodiments, each of the first slug segment and the second slug segment is a target slug segment, each of the first target waveform function and the second target waveform function is a preset target waveform function, and design parameters of the target slug segment are obtained using the following method.

The target slug segment is physically discretized along its length direction and is discretized into N particles, in which the $i^{th}$ particle at any moment t satisfies a first formula, and the $i^{th}$ particle at any moment $t+\Delta t$ satisfies a second formula, a third formula and a fourth formula, the first formula: $k_i(\Delta u_i - \Delta u_{i-1}) + k_i(\Delta u_{i+1} - \Delta u_i) = m_i \Delta a_i$, $i = 1 \ldots N$ the second formula: $v_{i(t+1/2\Delta t)} = v_{i(t)} 1/2 a_{i(t)} \Delta t$, $i = 1 \ldots N$
the third formula: $u_{i(t+\Delta t)} = u_{i(t)} + v_{i(t+1/2\Delta t)} \Delta t$, $i = 1 \ldots N$
the fourth formula: $v_{i(t+\Delta t)} = v_{i(t+1/2\Delta t)} + 1/2(a_{i(t)} + \Delta a_t)\Delta t$, $i = 1 \ldots N$, in which N is an integer greater than or equal to 2; i is any one of 1 to N; t is a preset calculation time; $\Delta t$ is a time step length; $\Delta u_i$ is a displacement increment of the $i^{th}$ particle; $k_i$ is a stiffness coefficient of the $i^{th}$ particle; $m_i$ is a mass of the $i^{th}$ particle; $\Delta a_i$ is an acceleration increment of the $i^{th}$ particle; $v_i$ is a velocity of the $i^{th}$ particle; $a_i$ is an acceleration of the $i^{th}$ particle; and $u_i$ is a displacement of the $i^{th}$ particle.

A calculated target waveform function, in a discrete form, of the target slug segment is obtained by an iterative algorithm. When a difference between the calculated target waveform function in the discrete form and the preset target waveform function is smaller than or equal to a preset value, design parameters corresponding to the calculated target waveform function in the discrete form are the design parameters of the target slug segment.

The calculated target waveform function in the discrete form means that the calculated target waveform function is expressed in the form of discrete points, specifically in the form of displacements and internal stresses of a plurality of discrete points at different moments. For example, the $i^{th}$ particle has a corresponding displacement and internal stress at an initial moment, and the $i^{th}$ particle has a corresponding displacement and internal stress at moment t.

In order to achieve a controllable waveform of the impact testing apparatus, it can be theoretically summarized as a problem of inversely solving a boundary value of a one-dimensional wave equation. Specifically, the preset target waveform function is given in a fifth formula (i.e., a preset target waveform function $\sigma(x, t)$ at any moment t and at any position x inside the target slug segment), and key design parameters involved in a design process are solved inversely, including a body shape function $A(x)$, a density function $\rho(x)$, and an elastic modulus function $E(x)$ implicitly contained in $\sigma(x,t)$.

The fifth formula is $$\frac{\partial A(x)}{\partial x}\sigma(x, t) + \frac{\partial \sigma(x, t)}{\partial x}A(x) = \rho(x)A(x)\frac{\partial^2 u(x, t)}{\partial t^2}.$$

In fact, no matter whether the fifth formula is solved forward or backward, the amount of calculation is huge, and there is no definite solution. Conventional server computing nodes cannot handle such a huge amount of computation. Therefore, the computational cost cannot be reduced simply by mathematically discretizing the fifth formula.

In the embodiments of the present disclosure, the physical discretization of the "continuous medium dynamics problem" represented by the one-dimensional wave equation can significantly reduce the computational cost. Specifically, the target slug segment is considered as a string of spring-linked mass spheres, and constitutive relations of the size, density and contact of the particles are used to correspond to the body shape function $A(x)$, the density function $\rho(x)$, and the elastic modulus distribution function $E(x)$ of the target slug segment. Since the particle discrete elements control the displacement function $u(x,t)$ of each particle based on Newton's second law, the numerical method naturally has a critical inertial effect in the dynamics.

The fifth formula is solved indirectly in the form of physical discretization in the embodiments of the present disclosure. This method converts continuous, coupled second-order partial differential equations into discrete, decoupled, parallel-solvable ordinary differential equations, greatly improving the computational efficiency under the same accuracy conditions, and providing a practical, trial-and-error solution to the inverse solution of the fifth formula.

Specifically, in an example, the first slug segment is the target slug segment, the first target waveform function is the preset target waveform function, and the design parameters of the target slug segment are obtained using the following method.

The target slug segment is physically discretized along its length direction (X-direction) and is discretized into N particles, in which the $i^{th}$ particle at any moment t satisfies the first formula, and the $i^{th}$ particle at any moment $t+\Delta t$ satisfies the second formula, the third formula and the fourth formula.

For the $i^{th}$ particle, $k_i$ and $m_i$ can be obtained by giving initial trial functions $A_0(x)$, $\rho_0(x)$ and $E_0(x)$ based on the preset target waveform function, obtaining $m_i$ based on $A_0(x)$ and $\rho_0(x)$, and obtaining $k_i$ based on $A_0(x)$ and $E_0(x)$.

Specifically, $$k_i = A_0\left(\frac{x_{i+1} + x_i}{2}\right)E_0\left(\frac{x_{i+1} + x_i}{2}\right)/(x_{i+1} - x_i).$$

$A_0(x)$ is an initial trial body shape function of the target slug segment; $\rho_0(x)$ is an initial trial density function of the target slug segment; and $E_0(x)$ is an initial trial elastic modulus function of the target slug segment.

$A_0(x)$, $\rho_0(x)$ and $E_0(x)$ are obtained by defining normalized trial functions $$\overline{A_0(x)},$$

$$\overline{\rho_0(x)} \text{ and } \overline{E_0(x)}$$

to be directly proportional to a normalized waveform function $\overline{\sigma(x, t)}$, and
defining a suffix constant C of the body shape function $A_0(x)$ to be directly proportional to a starting point leap ratio, that is, $\overline{A_0(x)} + C = \overline{\rho_0(x)} = \overline{E_0(x)} = \overline{\sigma(x, t)}$, in which, $\overline{A_0(x)} = A_0(x)/\max(A_0(x))$;

$\overline{\rho_0(x)} = \rho_0(x)/\max(\rho_0(x))$;

$\overline{E_0(x)} = E_0(x)/\max(E_0(x))$;

$\overline{\sigma(x, t)} = \sigma(x, t)/\max(\sigma(x, t))$.

At the initial moment, i.e., at the moment when t equals zero, for the $i^{th}$ particle, $k_i$ and $m_i$ are calculated by the above formulas; $\Delta u_i$, $\Delta u_{i-1}$ and $\Delta u_{i+1}$ are given by the user; and $\Delta a_i$ can be acquired by substituting $k_i$, $m_i$, $\Delta u_i$, $\Delta u_{i-1}$ and $\Delta u_{i+1}$ into the first formula.

For the second formula, $\Delta t$ can be obtained by calculation; $v_{i(0)}$ and $a_{i(0)}$ are given by the user; and $v_{i(1/2\Delta t)}$ can be acquired by substituting $\Delta t$, $v_{i(0)}$ and $a_{i(0)}$ into the second formula.

For the third formula, $\Delta t$ can be obtained by calculation; $u_{i(0)}$ is given by the user; $v_{i(1/2\Delta t)}$ is calculated by the second formula; and $u_{i(\Delta t)}$ can be acquired by substituting $u_{i(0)}$, $v_{i(1/2\Delta t)}$ and $\Delta t$ into the third formula.

For the fourth formula, $\Delta t$ can be obtained by calculation; $v_{i(1/2\Delta t)}$ is calculated by the third formula; $a_{i(0)}$ is given by the user; $\Delta a_i$ is calculated by the first formula; and $v_{i(\Delta t)}$ can be acquired by substituting $\Delta t$, $v_{i(1/2\Delta t)}$, $a_{i(0)}$ and $\Delta a_i$ into the fourth formula.

In the above formulas, $$\Delta t = \frac{L}{200Nv},$$

in which V is the initial velocity of the target slug segment, N is the number of particles, L is the length of the target slug segment, and V, N and L are all given by the user.

At the next moment, i.e. at the moment of $\Delta t$, for the first formula, a new displacement increment (an updated displacement increment of the $i^{th}$ particle) calculated by the fourth formula at the initial moment is substituted into the first formula to obtain a new acceleration increment (an updated acceleration increment of the $i^{th}$ particle).

For the second formula, $v_{i(\Delta t)}$ is calculated by the fourth formula at the initial moment; $a_{i(\Delta t)}$ is calculated; and $v_{i(\Delta t+1/2\Delta t)}$ is acquired by substituting $\Delta t$, $v_{i(\Delta t)}$ and $a_{i(\Delta t)}$ into the second formula, in which, $a_{i(\Delta t)}$ is obtained by adding $a_{i(0)}$ to $\Delta a_i$.

For the third formula, $v_{i(\Delta t+1/2\Delta t)}$ is calculated by the fourth formula; $u_{i(\Delta t)}$ is calculated by the third formula at the initial moment; and $u_{i(\Delta t+\Delta t)}$ is acquired by substituting $\Delta t$, $v_{i(\Delta t+1/2\Delta t)}$ and $u_{i(\Delta t)}$ into the third formula.

For the fourth formula, $v_{i(\Delta t+1/2\Delta t)}$ is calculated by the second formula; $a_{i(\Delta t)}$ is calculated; $\Delta a_i$ is obtained by the first formula (an updated acceleration increment of the $i^{th}$ particle); and $v_{i(\Delta t+\Delta t)}$ is acquired by substituting $\Delta t$, $\Delta a_i$, $a_{i(\Delta t)}$ and $v_{i(\Delta t+1/2\Delta t)}$.

Iterative calculation is performed on the first to fifth formulae in sequence, and $\sigma_0(x,t)$ is a result of the iterative calculation. $\sigma_0(x,t)$ is the calculated target waveform function in the discrete form.

The specific number of iteration calculation is obtained by the following formula:

$$N_{step} = \frac{t}{\Delta t}.$$

If a difference value between $\sigma_0(x,t)$ and $\sigma(x,t)$ is smaller than or equal to a preset value, $A_0(x)$, $\rho_0(x)$ and $E_0(x)$ design parameters of the target slug segment, i.e., $A_0(x)$ is $A(x)$, $\rho_0(x)$ is $\rho(x)$, and $E_0(x)$ is $E(x)$. If a different value $\sigma_0(x,t)$ and $\sigma_0(x,t)$ is greater than a preset value, the initial trial body shape function of the target slug segment is redefined as $A_1(x)$, the initial trial density function as $\rho_1(x)$, and the initial trial elastic modulus function as $E_1(x)$, until a difference between $\sigma_1(x,t)$ and $\sigma(x,t)$ is smaller than or equal to the preset value, in which case $A_1(x)$, $\rho_1(x)$ and $E_1(x)$ are design parameters of the target slug segment, i.e., $A_1(x)$ is $A(x)$, $\rho_1(x)$ is $\rho(x)$, and $E_1(x)$ is $E(x)$.

After the design parameters of the first slug segment and the second slug segment are obtained by the above methods, the impact slug can be processed according to the design parameters of the first slug segment and the second slug segment, and the impact testing apparatus having the impact slug can output the complex target waveform required by the user.

The impact testing apparatus according to the embodiments of the present disclosure has the following advantages.

The excitation process of stress waves at the medium strain rate ($10^{-2}$-$10^{1}$/s) can be realized. The impact testing apparatus in the related art has a strain rate excitation range of ($10^{-1}$-$10^{3}$/s). The strain rate range of the stress waves required for most dynamic disaster situations in geotechnical engineering, mining engineering, petroleum engineering, water engineering, etc. conforms to the excitation range formed by the present disclosure. The impact testing apparatus according to the embodiments of the present disclosure can simulate geotechnical dynamic disaster processes scientifically and accurately, and provide a basic scientific test equipment guarantee for disaster prevention, mitigation, control and prediction of various natural and man-made geological disasters.

Additionally, the controllable waveform excitation process of stress waves at the medium strain rate can be realized. With the method of obtaining the design parameters of the impact slug according to the embodiments of the present disclosure, the obtained impact slug can excite the complex target waveform demanded by the user.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion.

These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of means at least two, such as two, three, etc.

In the present disclosure, unless otherwise explicitly specified and defined, the terms "mounted," "coupled," "connected," "fixed" and the like are used broadly, and may be, for example, fixed connections, detachable connections, or integral connections; may also be mechanical or electrical connections or intercommunication; may also be direct connections or indirect connections via intermediate media; may also be inner communications or interactions of two elements. For those skilled in the art, the specific meaning of the above terms in the present disclosure can be understood according to the specific circumstances.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an intermediate medium formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the above embodiments have been shown and described, it can be understood that the above embodiments are exemplary and shall not be understood as limitation to the present disclosure, and changes, modifications, alternatives and variations can be made in the above embodiments within the scope of the present disclosure.

What is claimed is:

1. An impact slug, comprising:
    a first slug segment; and
    a second slug segment,
    wherein the first slug segment and the second slug segment are arranged in sequence along a length direction of the impact slug and are connected;
    wherein design parameters of the impact slug are obtained by:
    obtaining a first target waveform function and a second target waveform function based on a target waveform function of a target complex waveform provided by a user, the first target waveform function and the second target waveform function forming the target waveform function; and
    obtaining design parameters of the first slug segment based on the first target waveform function and design parameters of the second slug segment based on the second target waveform function;
    wherein:
    each of the first slug segment and the second slug segment is a target slug segment,
    each of the first target waveform function and the second target waveform function is a preset target waveform function, and
    design parameters of the target slug segment are obtained by:
    (i) physically discretizing the target slug segment along its length direction into N particles, wherein the $i^{th}$ particle at any moment t satisfies a first formula, and the $i^{th}$ particle at any moment t+Δt satisfies a second formula, a third formula and a fourth formula,
    the first formula: $k_i(\Delta u_i - \Delta u_{i-1}) + k_i(\Delta u_{i+1} - \Delta u_i) = m_i \Delta a_i$, i=1 . . . N
    the second formula: $v_{i(t+1/2\Delta t)} = v_{i(t)} 1/2 a_{i(t)} \Delta t$, i=1 . . . N
    the third formula: $u_{i(t+\Delta t)} = u_{i(t)} + v_{i(t+1/2\Delta t)} \Delta t$, i=1 . . . N
    the fourth formula: $v_{i(t+\Delta t)} = v_{i(t+1/2\Delta t)} + 1/2(a_{i(t)} + \Delta a_t) \Delta t$, i=1 . . . N,
    wherein N is an integer greater than or equal to 2; i is any one of 1 to N; t is a preset calculation time; Δt is a time step length; $\Delta u_t$ is a displacement increment of the $i^{th}$ particle; $k_i$ is a stiffness coefficient of the $i^{th}$ particle; $m_i$ is a mass of the $i^{th}$ particle; $\Delta a_i$ is an acceleration increment of the $i^{th}$ particle; $v_i$ is a velocity of the $i^{th}$ particle; $a_i$ is an acceleration of the $i^{th}$ particle; and $u_i$ is a displacement of the $i^{th}$ particle; and
    (ii) obtaining a calculated target waveform function, in a discrete form, of the target slug segment by an iterative algorithm, wherein when a difference between the calculated target waveform function in the discrete form and the preset target waveform function is smaller than or equal to a preset value, design parameters corresponding to the calculated target waveform function in the discrete form are the design parameters of the target slug segment.

2. The impact slug according to claim 1, wherein the second slug segment has a different shape and/or a different elastic modulus from the first slug segment.

3. The impact slug according to claim 1, wherein the first slug segment has at least one of a cylindrical shape, a spindle shape, and a pyramid shape.

4. The impact slug according to claim 1, wherein the second slug segment has at least one of a cylindrical shape, a spindle shape, and a pyramid shape.

5. The impact slug according to claim 1, wherein the second slug segment is connected to the first slug segment by bonding.

6. The impact slug according to claim 1, wherein each of the first slug segment and the second slug segment is made of a POM material.

7. The impact slug according to claim 1, wherein:
initial trial functions $A_0(x)$, $\rho_0(x)$ and $E_0(x)$ are given based on the preset target waveform function,
$m_i$ is obtained based on $A_0(x)$ and $\rho_0(x)$, and
$k_i$ is obtained based on $A_0(x)$ and $E_0(x)$,
wherein $A_0(x)$ is an initial trial body shape function of the target slug segment; $\rho_0(x)$ is an initial trial density function of the target slug segment; and $E_0(x)$ is an initial trial elastic modulus function of the target slug segment.

8. An impact testing apparatus, comprising:
a holder; and
an impact slug on the holder, the impact slug comprising a first slug segment and a second slug segment arranged in sequence along a length direction of the impact slug, and the second slug segment being connected to the first slug segment,
wherein design parameters of the impact slug are obtained by:
obtaining a first target waveform function and a second target waveform function based on a target waveform function of a target complex waveform provided by a user, the first target waveform function and the second target waveform function forming the target waveform function; and
obtaining design parameters of the first slug segment based on the first target waveform function and design parameters of the second slug segment based on the second target waveform function;
wherein:
each of the first slug segment and the second slug segment is a target slug segment,
each of the first target waveform function and the second target waveform function is a preset target waveform function, and
design parameters of the target slug segment are obtained by:
(i) physically discretizing the target slug segment along its length direction into N particles, wherein the $i^{th}$ particle at any moment t satisfies a first formula, and the $i^{th}$ particle at any moment $t+\Delta t$ satisfies a second formula, a third formula and a fourth formula,
the first formula: $k_i(\Delta u_i - \Delta u_{i-1}) + k_i(\Delta u_{i+1} - \Delta u_i) = m_i \Delta a_i$, $i=1 \ldots N$
the second formula: $v_{i(t+1/2\Delta t)} = v_{i(t)} 1/2 a_{i(t)} \Delta t$, $i=1 \ldots N$
the third formula: $u_{i(t+\Delta t)} = u_{i(t)} + v_{i(t+1/2\Delta t)} \Delta t$, $i=1 \ldots N$
the fourth formula: $v_{i(t+\Delta t)} = v_{i(t+1/2\Delta t)} + 1/2(a_{i(t)} + \Delta a_t)\Delta t$, $i=1 \ldots N$,
wherein N is an integer greater than or equal to 2; i is any one of 1 to N; t is a preset calculation time; $\Delta t$ is a time step length; $\Delta u_i$ is a displacement increment of the $i^{th}$ particle; $k_i$ is a stiffness coefficient of the $i^{th}$ particle; $m_i$ is a mass of the $i^{th}$ particle; $\Delta a_i$ is an acceleration increment of the $i^{th}$ particle; $v_i$ is a velocity of the $i^{th}$ particle; $a_i$ is an acceleration of the $i^{th}$ particle; and $u_i$ is a displacement of the $i^{th}$ particle; and
(ii) obtaining a calculated target waveform function, in a discrete form, of the target slug segment by an iterative algorithm, wherein when a difference between the calculated target waveform function in the discrete form and the preset target waveform function is smaller than or equal to a preset value, design parameters corresponding to the calculated target waveform function in the discrete form are the design parameters of the target slug segment.

9. The impact testing apparatus according to claim 8, wherein the second slug segment has a different shape and/or a different elastic modulus from the first slug segment.

10. The impact testing apparatus according to claim 8, wherein the first slug segment has at least one of a cylindrical shape, a spindle shape, and a pyramid shape.

11. The impact testing apparatus according to claim 8, wherein the second slug segment has at least one of a cylindrical shape, a spindle shape, and a pyramid shape.

12. The impact testing apparatus according to claim 8, wherein the second slug segment is connected to the first slug segment by bonding.

13. The impact testing apparatus according to claim 8, wherein each of the first slug segment and the second slug segment is made of a POM material.

14. The impact testing apparatus according to claim 8, wherein:
initial trial functions $A_0(x)$, $\rho_0(x)$ and $E_0(x)$ are given based on the preset target waveform function,
$m_i$ is obtained based on $A_0(x)$ and $\rho_0(x)$, and
$k_i$ is obtained based on $A_0(x)$ and $E_0(x)$,
wherein $A_0(x)$ is an initial trial body shape function of the target slug segment; $\rho_0(x)$ is an initial trial density function of the target slug segment; and $E_0(x)$ is an initial trial elastic modulus function of the target slug segment.

* * * * *

UNITED STATES PATENT AND TRADEMARK OFFICE
CERTIFICATE OF CORRECTION

| | | |
|---|---|---|
| PATENT NO. | : 11,609,167 B1 | Page 1 of 1 |
| APPLICATION NO. | : 17/820355 | |
| DATED | : March 21, 2023 | |
| INVENTOR(S) | : Chunyang Cui | |

It is certified that error appears in the above-identified patent and that said Letters Patent is hereby corrected as shown below:

On the Title Page

Item [30], insert:
--Aug. 19, 2021 (CN) 202110951971.4--

Signed and Sealed this
Fourth Day of July, 2023

Katherine Kelly Vidal

Katherine Kelly Vidal
*Director of the United States Patent and Trademark Office*